United States Patent [19]

Litvishkov et al.

[11] 4,178,304
[45] Dec. 11, 1979

[54] METHOD OF PRODUCING ORTHO-AMINOBENZONITRILE

[76] Inventors: Jury N. Litvishkov, ulitsa Gadzhibekova, 37-43, blok 3, kv. 44; Medzhid R. O. Efendiev, ulitsa 2 Zavodskaya, 9/1, kv. 24; Ramiz G. K. O. Rizaev, ulitsa Sharif-Zade, 148, blok 5, kv. 67; Khalida Y. K. Kulieva, ulitsa Shaumiana, 28, kv. 27, all of Baku, U.S.S.R.

[21] Appl. No.: 885,366

[22] Filed: Mar. 13, 1978

[51] Int. Cl.$^2$ .................. C07C 121/78; C07C 120/00; C07C 120/14
[52] U.S. Cl. .............................. 260/465 E; 260/465 C
[58] Field of Search ......................... 260/465 C, 465 E

[56] References Cited

U.S. PATENT DOCUMENTS

| | | | |
|---|---|---|---|
| 3,370,081 | 2/1968 | Sennewald et al. | 260/465 C |
| 3,374,262 | 3/1968 | Seefelder et al. | 260/465 E |
| 3,475,350 | 10/1969 | Winnick et al. | 260/465 C X |
| 3,665,029 | 5/1972 | Goerth et al. | 260/465 E |
| 3,783,142 | 1/1974 | Bakke et al. | 260/465 E |
| 3,803,204 | 4/1974 | Grasselli et al. | 260/465 C |

FOREIGN PATENT DOCUMENTS

| | | | |
|---|---|---|---|
| 820125 | 9/1959 | United Kingdom | 260/465 C |
| 432135 | 11/1974 | U.S.S.R. | 260/465 C |

*Primary Examiner*—Joseph P. Brust
*Attorney, Agent, or Firm*—Steinberg & Blake

[57] ABSTRACT

According to the invention, a method of producing orthoaminobenzonitrile is provided according to which ortho-toluidine is reacted with ammonia at a temperature of 360°–460° C. in the presence of oxygen, or a mixture thereof with inert gases, and a catalyst, namely, a mixture of oxides of antimony, bismuth, vanadium, and phosphorus taken in a weight ratio 5–12:3–9:1–9:0–.5–4, respectively, the catalyst being applied to a support.

The invention ensures an increase in the yield of orthoaminobenzonitrile per unit volume of the catalyst and selectivity with respect to the final product.

4 Claims, No Drawings

METHOD OF PRODUCING ORTHO-AMINOBENZONITRILE

FIELD OF APPLICATION

The present invention relates to methods of producing nitriles of aromatic aminoacids and more particularly to a method of producing ortho-aminobenzonitrile. Ortho-aminobenzonitrile finds application as a monomer for synthesizing super- thermostable and light-fast polymers, modifying additives for manufacturing thermostable and light-fast paint and varnish materials, and as a raw material for pharmaceuticals.

BACKGROUND OF THE INVENTION

The method of producing ortho-aminobenzonitrile by interaction of ortho-nitrotoluene with ammonia in the presence of a catalyst of silica gel, aluminium oxide, or zeolites is known in the art. The process is performed at 350°–550° C., contact time 3–6, and molar ratio ortho-nitrotoluene: ammonia equal to 1:(22–28), respectively.

Conversion of ortho-nitrotoluene is 93 mol.% and selectivity 25 mol.%, which means that the yield of ortho-aminobenzonitrile for the ortho-nitrotoluene passed is 23.3 mol.%.

The yield of ortho-aminobenzonitrile per liter of the catalyst per hour is 26.67 g/l per hour.

The known method is disadvantageous in that the capacity of the unit volume of the catalyst is low, frequent regeneration of the catalyst is necessary, and selectivity of ortho-aminobenzonitrile formation is low. In addition, a considerable excess of ammonia is used in the process, which can cause corrosion of the equipment.

OBJECT OF THE INVENTION

It is an object of the invention to increase the yield of and selectivity with respect to ortho-aminobenzonitrile.

SUMMARY OF THE INVENTION

This object is accomplished in a method of producing ortho-aminobenzonitrile by reacting an aromatic compound with ammonia in the presence of a catalyst at a temperature of 360°–460° C. According to the invention, the process is performed in the presence of oxygen, or a mixture thereof with inert gases, as an aromatic compound use is made of ortho-toluidine, and as a catalyst a mixture of oxides of antimony, bismuth, vanadium, and phosphorus is used the catalyst being applied to a support.

It is expedient to use as a support aluminium oxide calcined at 900° C., or silica gel.

To enhance efficiency and selectivity, it is preferable to use a catalyst of the following composition in weight %:

vanadium oxide—1–9
antimony oxide—5–12
bismuth oxide—3–9
phosphorus oxide—0.5–4
support—the balance.

To ensure high conversion of the initial ortho-toluidine and stable operation of the catalyst, it is expedient to carry out the process at a molar ratio between the components ortho-toluidine: ammonia:oxygen equal to 1:(5–20):(2–10), respectively.

DETAILED DESCRIPTION OF THE INVENTION

The herein-proposed method of producing ortho-aminobenzonitrile is accomplished in the following way.

An initial mixture consisting of ortho-toluidine, ammonia, and oxygen (use of air is possible) at a molar ratio of 1:(5–20):(2–10), respectively, is fed at a certain speed to a heater for converting ortho-toluidine into a gaseous state and then into a reactor filled with a catalyst.

The process is conducted in a fluidized bed of the catalyst (grain size is 0.8–1.2 mm). A mixture of the reaction products leaving the reactor is passed through traps cooled with ice for catching hydrocarbon compounds.

The final product is separated by usual or vacuum rectification, which is possible due to a significant difference in the boiling points of the initial and resulting products (boiling points: toluene, 110° C.; benzonitrile, 191° C.; ortho-toluidine, 202° C.; ortho-aminobenzonitrile, 256° C.). The method is accomplished at a temperature of 360°–460° C., preferably at 360°–380° C. and contact time 0.5–2 sec, preferably 1 sec.

Selectivity with respect to ortho-aminobenzonitrile is the highest at 360°–380° C.

With a decrease in contact time below 0.5 sec., both conversion of ortho-toluidine and yield of ortho-aminobenzonitrile for the passed ortho-toluidine diminish.

An increase in the contact time above 2 sec reduces considerably the capacity of the catalyst per unit volume.

As a catalyst use is made of a mixture of oxides of vanadium, antimony, bismuth, phosphorus applied to a support, namely, silica gel or aluminium oxide calcined at 900° C. The composition of the catalyst is as follows (in weight %):

vanadium oxide—1–9
antimony oxide—5–12
bismuth oxide—3–9
phosphorus oxide—0.5–4
support—the balance.

The optimum composition of the catalyst is given below (in weight %):

vanadium oxide—1
antimony oxide—5
bismuth oxide—5
phosphorus oxide—2
aluminium oxide—87.

The catalyst is prepared in the following way.

Aluminium oxide is calcined in a muffle furnace, ground, and sifted on a mechanical vibroscreen. To prepare an active part of the catalyst, corresponding amounts of antimony and bismuth salt solutions are added to an aqueous solution of ammonium metavanadate at 50°–60° C. and under intensive stirring. Then, a required amount of ortho-phosphoric acid is added to the resulting mixture. The solution, ready for impregnating the support, is heated to 85°–90° C. and a weighed amount of the support is introduced into it. At this temperature impregnation of the support lasts for 5–6 hours, after which excess moisture is evaporated.

The remaining mass, which is the support impregnated with salts of antimony, bismuth, vanadium, and ortho-phosphoric acid, is dried at 150°–200° C. for 3–4 hours and calcined at 500°–600° C. for 8–12 hours.

As a result, a catalyst is obtained consisting of a mixture of oxides of antimony, bismuth, vanadium, and phosphorus applied to the support.

The herein-proposed method of producing ortho-aminobenzonitrile ensures an increase in the ortho-aminobenzonitrile yield per unit volume of the catalyst up to 204.4 g and in selectivity with respect to ortho-aminobenzonitrile up to 60 mol.% due to enhanced efficiency and selectivity of the catalyst.

Because of enhanced selectivity of the catalyst, the amount of side products decreases and they are easily separated from the final product, namely, ortho-aminobenzonitrile.

For a better understanding of the present invention specific examples of realizing the proposed method are given hereinbelow by way of illustration.

EXAMPLE 1

An initial mixture consisting of ortho-toluidine, ammonia, oxygen, and nitrogen in a molar ratio of 1:5:5:15, respectively, is fed into a heater and then into a reactor filled with a catalyst. The composition of the reaction components and the flow rates are as follows:

ortho-toluidine—0.33 mole/hr, (3.5 g/hr), 0.739 l/hr
$NH_3$—0.165 mole/hr—3.7 l/hr
$O_2$—0.165 mole/hr—3.7 l/hr
$N_2$—0.5 mole/hr A mixture of oxides of vanadium, antimony, bismuth, and phosphorus applied to aluminium oxide calcined at 900° C. is used as a catalyst.

The catalyst is used in an amount of 3.7 g (5.4 ml) and is of the following composition in weight %:

antimony oxide—5
bismuth oxide—5
phosphorus oxide—2
vanadium oxide—1
aluminium oxide—87.

The process is run in a fluidized bed of the catalyst at a temperature of 380° C. and contact time 1 sec. The mixture of the products after the reactor is passed through traps cooled with ice for catching the hydrocarbon components. The final product is separated by ordinary or vacuum rectification.

Conversion degree of ortho-toluidine is 78.2 mol.%.
Selectivity with respect to: ortho-aminobenzonitrile—32.7 mol%
benzonitrile—14.4 mol.%
toluene—11.4 mol.%
$CO_2$—41.5 mol.%

The yield of orthoaminobenzonitrile for the passed ortho-toluidine is 25.6 mol.%; the yield of orthoaminobenzonitrile is 182.3 g/l (cat.) hr.

EXAMPLE 2

The method is realized by following the procedure described in Example 1.

The composition of the catalyst is similar to that described in Example 1.

The weighed amount of the catalyst is 8.5 g (12.5 ml). Molar ratio: ortho-toluidine: $NH_5:O_2 = 1:10:5$; $O_2:N_2 = 1:3$. The composition of the reaction components and their flow rates are:

ortho-toluidine—0.063 mole/hr; (6.7 g/hr), 1.411 l/hr
ammonia—0.63 mole/hr—14.112 l/hr
oxygen—0.315 mole/hr—7.056 l/hr
nitrogen—0.945 mole/hr—21.17 l/hr.
Contact time is 1 sec.
Temperature—380° C.

Degree of ortho-toluidine conversion—70.1 mole.%.
Selectivity with respect to:
ortho-aminobenzonitrile—48.1 mol.%
benzonitrile—20.5 mol.%
toluene—7.8 mol.%
carbon dioxide—23.6 mol.%.

The yield of ortho-aminobenzonitrile for the passed ortho-toluidine is 33.7 mol.%.

The yield of orthoaminobenzonitrile is 204.4 g/l (cat.)hr.

EXAMPLE 3

The method is realized by following the procedure described in Example 1.

The catalyst used has the composition similar to that described in Example 1.

The weighed amount of the catalyst is 6.96 g (9.95 ml).

Molar ratio: ortho-toluidine: $NH_3:O_2 = 1:15:5$; $O_2:N_2 = =1:3$.

The composition of the reaction components and their flow rates:

ortho-toluidine—0.039 mole/hr, (4.2 g/hr), 0.874 l/hr
ammonia—0.584 mole/hr—13.1 l/hr
oxygen—0.195 mole/hr—4.368 l/hr
nitrogen—0.585 mole/hr—13.104 l/hr.
Contact time—1 sec.
Temperature—380° C.

Degree of ortho-toluidine conversion—58.4 mol.%.
Selectivity with respect to:
ortho-aminobenzonitrile—53.8 mol.%
benzonitrile—25.3 mol.%
toluene—6.9 mol.%
carbon oxide—14.0 mol.%.

The yield of ortho-aminobenzonitrile for the passed ortho-toluidine is 31.4 mol.%.

The yield of ortho-aminobenzonitrile—145.8 g/l (cat.)hr.

EXAMPLE 4

The method is realized by following the procedure described in Example 1.

The composition of the catalyst used is similar to that described in Example 1.

The weighed amount of the catalyst is 6.96 g (9.95 ml). The molar ratio: ortho-toluidine:$NH_3:O_2 = 1:20:5$; $O_2:N_2 = 1:3$. The composition of the reaction components and their flow rates:

ortho-toluidine—0.039 mole/hr, (4.2 g/hr), 0.874 l/hr
ammonia—0.78 mole/hr,—17.472 l/hr
oxygen—0.195 mole/l—4.368 l/hr
nitrogen—0.585 mole/l—13.104 l/hr.
Contact time—1 sec.
Temperature—380° C.

Ortho-toluidine conversion degree—39.8 mol.%.
Selectivity with respect to:
ortho-aminobenzonitrile—58.2 mol.%
benzonitrile—26.5 mol.%
toluene—3.7 mol.%
carbon dioxide—11.6 mol.%.

The yield of ortho-aminobenzonitrile for the passed ortho-toluidine is 23.2 mol.%. The yield of ortho-aminobenzonitrile—107.7 g/l (cat.)hr.

EXAMPLE 5

The method is realized by following the procedure described in Example 1.

The catalyst is used of the composition similar to that described in Example 1.

The weighed amount of the catalyst is 8.5 g (12.2 ml). The molar ratio: ortho-toluidine:$NH_3$:$O_2$=1:10:2; $O_2$:$N_2$=1:3. The composition of the reaction components and their flow rates:
ortho-toluidine—0.048 mole/hr,(5.2 g/hr), 1.4 l/hr
ammonia—0.48 mole/hr—14.0 l/hr
oxygen—0.096 mole/hr—2.8 l/hr
nitrogen—0.294 mole/hr—6.55 l/hr.
Contact time—1 sec.
Temperature—380° C.
Degree of ortho-toluidine conversion—56.4 mol.%.
Selectivity with respect to:
ortho-aminobenzonitrile—32.3 mol%
benzonitrile—19.1 mol%
toluene—21.5 mol%
carbon dioxide—17.1 mol%

The yield of ortho-aminobenzonitrile for the passed ortho-toluidine is 18.22 mol%. The yield of ortho-aminobenzonitrile—85.4 g/l (cat.)hr.

EXAMPLE 6

The method is realized by following the procedure described in Example 1.

The catalyst is used of the composition similar to that described in Example 1.

The weighed amount of the catalyst is 11.1 g (15.9 ml). The molar ratio: ortho-toluidine:$NH_3$:$O_2$=1:10:10; $O_2$:$N_2$=1:2.

The composition of the reaction components and their flow rates:
ortho-toluidine—0.048 mole/hr, (5.2 g/hr), 1.4 l/hr
ammonia—0.48 mole/hr—14 l/hr
oxygen—0.48 mole/hr—14 l/hr
nitrogen—0.96 mole/hr—28 l/hr.
Contact time—1 sec.
Temperature—380° C.
Degree of ortho-toluidine conversion—77.2 mol.%.
Selectivity with respect to:
ortho-aminobenzonitrile—28.5 mol.%
benzonitrile—16.9 mol.%
toluene—4.8 mol.%
carbon dioxide—49.8 mol.%

The yield of ortho-aminobenzonitrile for the passed ortho-toluidine is 22.0 mol.%. The yield of aminobenzonitrile—79.15 g/l (cat.)hr.

EXAMPLE 7

The method is realized by following the procedure described in Example 1.

The catalyst used is of the composition similar to that described in Example 1.

The weighed amount of the catalyst is 2.24 g (3.2 ml). The mole ratio: ortho-toluidine:$NH_3$:$O_2$=1:10:5;$O_2$:$N_2$=1:3. The composition of the reaction components and their flow rates:
ortho-toluidine—0.033 mole/hr, (3.5 g/hr), 0.739 l/hr
ammonia—0.33 mole/hr—7.39 l/hr
oxygen—0.165 mole/hr (3.5 g/hr) 3.7 l/hr
nitrogen—0.5 mole/hr—11.2 l/hr.
Contact time—0.5 sec.
Temperature—380° C.
Degree of ortho-toluidine conversion—16.9 mol.%.
Selectivity with respect to:
ortho-aminobenzonitrile—57.8 mol.%
benzonitrile—15.1 mol.%
toluene—11.9 mol.%
carbon dioxide—15.2 mol.%

The yield of ortho-aminobenzonitrile for the passed ortho-toluidine is 9.8 mol.%. The yield of ortho-aminobenzonitrile is 117.9 g(cat.)hr.

EXAMPLE 8

The method is realized by following the procedure described in Example 1.

The catalyst used has a composition similar to that described in Example 1.

The weighed amount of the catalyst is 8.96 g (12.8 ml).

The molar ratio: ortho-toluidine: $NH_3$:$O_2$=1:10:5; $O_2$:$N_2$=1:3.

The composition of the reaction components and their flow rates:
ortho-toluidine—0.033 mole/hr, (3.5 g/hr), 0.739 l/hr
ammonia—0.33 mole/hr—7.39 l/hr
oxygen—0.165 mole/hr—3.7 l/hr
nitrogen—0.5 mole/hr—11.2 l/hr.
Contact time—2 sec.
Temperature—380° C.
Degree of ortho-toluidine conversion—88.2 mol.%.
Selectivity with respect to:
ortho-aminobenzonitrile—24.3 mol.%
benzonitrile—14.6 mol.%
toluene—17.7 mol.%
carbon dioxide—43.4 mol.%.

The yield of ortho-aminobenzonitrile for the passed ortho-toluidine—21.4 mol.%. The yield of ortho-aminobenzonitrile—85.8 g/l(cat.)hr.

EXAMPLE 9

The method is realized by following the procedure described in Example 1.

The catalyst used is of a composition similar to that described in Example 1.

The weighed amount of the catalyst is 8.5 g (12.15 ml).

The molar ratio: ortho-toluidine:$NH_3$:$O_2$=1:10:5; $O_2$:$N_2$=1:3.

The composition of the reaction components and their flow rates:
ortho-toluidine—0.063 mole/hr, (6.7 g/hr), 1.411 l/hr
ammonia—0.63 mole/hr—14.112 l/hr
oxygen—0.315 mole/hr—7.056 l/hr
nitrogen—0.945 mole/hr—21.170 l/hr.
Temperature—360° C.
Degree of ortho-toluidine conversion—23.0 mol.%.
Selectivity with respect to:
ortho-aminobenzonitrile—61.0 mol.%
benzonitrile—13.3 mol.%
toluene—14.1 mol.%
carbon dioxide—11.6 mol.%.

The yield of ortho-aminobenzonitrile for the passed ortho-toluidine is 0.14 mol.%. The yield of ortho-aminobenzonitrile—84.92 g/l (cat.)hr.

EXAMPLE 10

The method is realized by following the procedure described in Example 1.

The catalyst used has a composition similar to that described in Example 1.

The weighed amount of the catalyst is 8.5 g (12.2 ml). Molar ratio: ortho-toluidine: $NH_3$:$O_2$=1:10:5; $O_2$:$N_2$=1:3.

The composition of the reaction components and their flow rates:

ortho-toluidine—0.063 mol./hr, (6.69 g/hr), 1.4 l/hr
ammonia—0.63 mole/hr—14.0 l/hr
oxygen—0.31 mole/hr—7.0 l/hr
nitrogen—0.93 mole/hr—2.0 l/hr.
Contact time—1 sec.
Temperature—400° C.
Degree of ortho-toluidine conversion—84.5 mol.%.
Selectivity with respect to:
  ortho-aminobenzonitrile—23.6 mol.%
  benzonitrile—17.2 mol.%
  toluene—17.4 mol.%
  carbon dioxide—41.8 mol.%.
The yield of ortho-toluidine for the passed ortho-toluidine is 19.9 mol.%. The yield of ortho-aminobenzonitrile is 119 g/l (cat.)hr.

EXAMPLE 11

The method is performed by following the procedure described in Example 1.

The catalyst used is of a composition similar to that described in Example 1.

The weighed amount of the catalyst is 8.5 g (12.15) ml.

The molar ratio: ortho-toluidine: $NH_3:O_2 = 1:10:5$; $O_2:N_2 = 1:3$.

The composition of the reaction components and their flow rates:
  ortho-toluidine—0.063 mole/hr, (6.7 g/hr), 1.411 l/hr
  ammonia—0.63 mole/hr,—14.112 l/hr
  oxygen—9.315 mole/hr—7.056 l/hr
  nitrogen—0.945 mole/hr—21.170 l/hr.
  Contact time—1 sec.
  Temperature—460° C.
  Degree of ortho-toluidine conversion—93.0 mol.%.
Selectivity with respect to:
  ortho-aminobenzonitrile—11.7 mol.%
  benzonitrile—18.4 mol.%
  toluene—9.7 mol.%
  carbon dioxide—60.2 mol.%
The yield of ortho-aminobenzonitrile for the passed ortho-toluidine is 10.9 mol.%. The yield of ortho-aminobenzonitrile—66.12 g/l(cat.)hr.

EXAMPLE 12

The method is realized by following the procedure described in Example 1.

The catalyst of the following composition (in weight %) was used in the reaction:
  $Sb_2O_3$—12, $Bi_2O_3$—9,
  $V_2O_5$—9, $P_2O_5$—4,
  $Al_2O_3$—66.

The reaction is run under the conditions similar to those described in Example 2.

The weighed amount of the catalyst is 8.5 g (11.6 mol).

The molar ratio: ortho-toluidine: $NH_3:O_2 = 1:10:5$; $O_2:N_2 = 1:3$. The composition of the reaction components and their flow rates:
  ortho-toluidine—0.063 mole/hr, (6.7 g/hr), 1.411 l/hr
  ammonia—0.63 mole/hr—14.112 l/hr
  oxygen—0.315 mole/hr—7.056 l/hr
  nitrogen—0.945 mole/hr—21.17 l/hr.
  Contact time—1 sec.
  Temperature—380° C.
  Degree of ortho-toluidine conversion—63.0 mol.%.
Selectivity with respect to:
  ortho-aminobenzonitrile—14.4 mol.%
  benzonitrile—12.3 mol.%
  toluene—4.5 mol.%
  carbon dioxide—68.8 mol.%.
The yield of aminobenzonitrile for the passed ortho-toluidine—9.07 mol.%.
The yield of ortho-aminobenzonitrile—57.6 g/l(cat.)hr.

EXAMPLE 13

The method is realized by following the procedure described in Example 1.

The catalyst of the following composition was used in the reaction (wt.%): $Sb_2O_5$—5, $Bi_2O_3$—3, $Al_2O_3$—90.5, $V_2O_5$—1, $P_2O_5$—0.5. The reaction conditions are similar to those described in Examples 2 and 8.

The weighed amount of the catalyst is 8.5 g (13.2 ml).

The molar ratio: ortho-toluidine: $NH_3:O_2 = 1:10:5$, $O_2:N_2 = 1:3$.

The composition of the reaction components and their flow rates:
  ortho-toludine—0.063 mole/hr (6.7 g/hr), 1.411 l/hr
  ammonia—0.63 mole/hr—14.112 l/hr
  oxygen—0.315 mole/hr—7.056 l/hr
  nitrogen—0.945 mole/hr—21.17 l/hr.
  Contact time—1 sec.
  Temperature—380° C.
  Degree of ortho-toluidine conversion—82.5 mol.%.
Selectivity with respect to:
  ortho-aminobenzonitrile—15.6 mol.%
  benzonitrile—18.6 mol.%
  toluene—8.3 mol.%
  carbon dioxide—57.5 mol.%.
The yield of ortho-aminobenzonitrile for the passed ortho-toluidine is 12.86 mol.%. The yield of ortho-aminobenzonitrile—71.9 g/l(cat.)hr.

EXAMPLE 14

The method is realized by following the procedure described in Example 1.

The catalyst of the following composition (wt.%) is used in the reaction: $V_2O_5$—2; $Sb_2O_5$—7; $Bi_2O_3$—7; $P_2O_5$—7; $Al_2O_3$—77. The weighed amount of the catalyst is 9.3 g (13.1 ml).

The molar ratio: ortho-toluidine:$NH_3:O_2 = 1:10:5$; $O_2:N_2 = 1:3$. The composition of the reaction components and their flow rates:
  ortho-toluidine—0.063 mole/hr (6,7 g/hr) 1.411 l/hr
  ammonia—0.63 mole/hr—14.11 l/hr
  oxygen—0.315 mole/hr—7.056 l/hr
  nitrogen—0.945 mole/hr—21.17 l/hr.
  Contact time—1 sec.
  Temperature—380° C.
  Degree of ortho-toluidine conversion—73.8 mol.%.
Selectivity with respect to
  ortho-aminobenzonitrile—34.5 mol.%
  benzonitrile—14.7 mol.%
  toluene—5.4 mol.%
  carbon dioxide—45.4 mol.%.
The yield of ortho-aminobenzonitrile for the passed ortho-toluidine is 25.5 mol.%. The yield of ortho-aminobenzonitrile—143.1 g/l(cat.)hr.

EXAMPLE 15

The method is realized by following the procedure described in Example 1. The catalyst of the following composition is used (in weight %): antimony oxide—5, bismuth oxide—5, phosphorus oxide—2, vanadium oxide—1, silica gel—87.

The weighed amount of the catalyst is 9.1 g (12.15 ml). The molar ratio: ortho-toluidine:$NH_3$:$O_2$=1:10:5; $O_2$:$N_2$=1:3. The composition of the reaction components and their flow rates:

ortho-toluidine—0.063 mole/hr—(6.7 g/hr)—1.411 l/hr
ammonia—0.63 mole/hr—14.112 l/hr
oxygen—0.315 mole/hr—7.056 l/hr
nitrogen—0.945 mole/hr—21.17 l/hr.
Contact time—1 sec.
Temperature—380° C.
Degree of toluidine conversion—78 mol.%.
Selectivity with respect to: ortho-aminobenzonitrile—12.5 mol.%
benzonitrile—8.3 mol.%
toluene—15.2 mol.%
carbon dioxide—64.0 mol.%

The yield of ortho-aminobenzonitrile for the passed ortho-toluidine is 9.75 mol.%. The yield of ortho-aminobenzonitrile—57.6 g/l(cat.)hr.

What is claimed is:

1. Method of producing ortho-aminobenzontrile, which comprises reacting ortho-toluidine with ammonia at a temperature of 360°-460° C. in the presence of oxygen, or a mixture thereof with inert gases, and a catalyst consisting essentially of a mixture of oxides of vanadium, antimony, bismuth, and phosphorus applied to a support, said oxides being present in a ratio by weight of 5-12:3-9:1-9:0.5-4, respectively.

2. The method of claim 1, wherein said support is made of calcined aluminium oxide or silica gel.

3. The method of claim 2, wherein said catalyst is of the following composition (wt.%):
vanadium oxide, 1-9
antimony oxide, 5-12
bismuth oxide, 3-9
phosphorus oxide, 0.5-4
support—the balance.

4. The method of claim 1, wherein the process is performed in a molar ratio of ortho-toluidine: ammonia: oxygen equal to 1:5-20:2-10, respectively.

* * * * *